Jan. 22, 1957   M. L. BENJAMIN ET AL   2,778,650
COLLET CHUCK
Filed March 11, 1954

INVENTORS
MILTON L. BENJAMIN and
STANLEY S. BENJAMIN
BY Oberlin & Limbach
ATTORNEYS.

United States Patent Office 2,778,650
Patented Jan. 22, 1957

2,778,650

COLLET CHUCK

Milton L. Benjamin and Stanley S. Benjamin, Cleveland, Ohio, assignors to Erickson Tool Company, a corporation of Ohio Application March 11, 1954, Serial No. 415,546

5 Claims. (Cl. 279—46)

The present invention relates generally as indicated to a collet chuck, and more particularly to a unique form of two-piece, simplified form of chuck and collet therefor which is adapted to accurately and securely grip the shank of a tool inserted within the collet.

A principal object of this invention is to provide a collet chuck of the character indicated in which the chuck body and the collet therewithin are threaded together, the latter being provided with wrench-engaging surfaces at its outer end and being arranged for uniform radial contraction from end to end to provide a long, uniform grip around the shank of a tool or the like inserted therewithin.

Another object of this invention is to provide a collet chuck of the character indicated in which, because of the direct threading together of the chuck body and contractible collet therewithin, the frusto-conical mating wedge surfaces may be of very slow taper for effecting powerful gripping and locking, but yet loosening and withdrawal of the collet is easy because the threads positively move said collet out of the body.

Another object of this invention is to provide a collet chuck of the character indicated in which the collet bore is counterbored within the threaded end thereof so that eccentricity between the threads of said collet and the frusto-conical wedging surface thereof, or eccentricity between the threads in said body and its frusto-conical wedge surface, is not effective to throw the tool gripped by the collet off-center.

Another object of this invention is to provide a simple, light-weight chuck which is of diameter not a great deal larger than the shank of the tool or the like gripped thereby, whereby the spinning weight is reduced to a minimum value. Thus, the present chuck can be mounted on high speed quills operating at about 75,000 R. P. M. and up to about 120,000 R. P. M. for grinding small holes or the like with so-called "mounted point" tools.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain embodiment of the invention, this being indicative, however, of but one of the various ways in which the principle of the invention may be employed.

Figure 1:
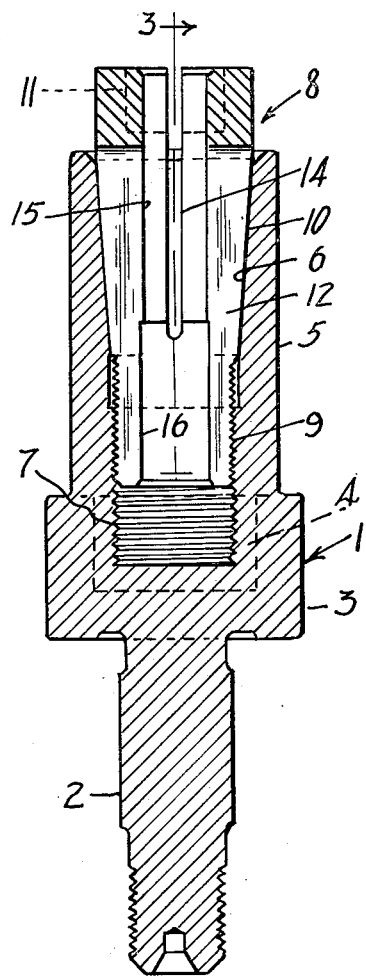
Fig. 1 is a diametrical cross-section view of a preferred embodiment of this invention, such section having been taken substantially along line 1—1, Fig. 2.
Figure 2:
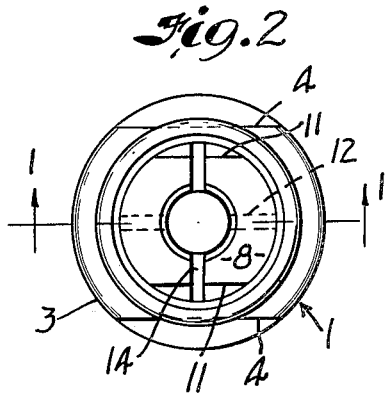
Fig. 2 is a top plan view.
Figure 3:
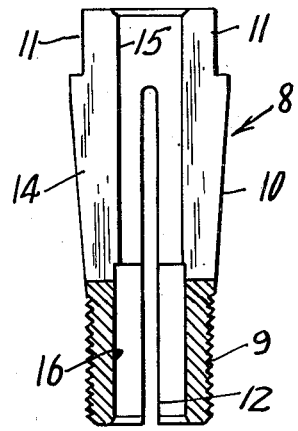
Fig. 3 is a cross-section view through the collet alone as taken substantially along the line 3—3, Fig. 1.

Referring now more particularly to the drawing, the chuck body 1 is shown as comprising a shank 2 adapted to be screwed into the spindle or quill of a metal-working machine, grinder, or the like. Adjacent said shank 2 is an enlarged portion 3 provided with parallel wrench-engaging flats 4 by which said chuck body may be screwed into the spindle or quill aforesaid. The other end portion 5 of said chuck body 1 is tubular and is formed with a long tapered or frusto-conical bore 6, the angle of which is preferably about 4° with respect to the axis of said bore, said bore 6 terminating at its small end in internal threads 7 coaxial with said bore.

Screwed into said body 1 is a contractible collet 8 which has external threads 9 engaged with the threads 7 in said body. Adjacent to the threaded end portion of said collet 8 is an intermediate frusto-conical portion 10 which is complementary with the frusto-conical bore 6 in said body. Adjacent the large end of said frusto-conical portion 10 of said collet 8 is a wrench-engaging portion comprising parallel flats 11. In order to make said collet 8 readily contractible uniformly from end to end, the same is diametrically slotted at 12 through the threaded end up through the large end of the frusto-conical portion 10 and also diametrically slotted at 14 through the wrench-engaging end down to the small end of said frusto-conical portion 10, it being noted that these slots 12 and 14 are perpendicularly related to one another, and that the slot 14 through the wrench-engaging end is normal to the parallel wrench-engaging faces 11, whereby when said collet 8 is screwed into said body 1, the radial contraction throughout its length will not in any way decrease the distance between said wrench-engaging flats 11. Moreover, the contraction of the collet 8 will not cause the flats 11 to assume a nonparallel relationship.

The collet 8 has a uniform diameter bore 15 within the wrench-engaging and frusto-conical portions thereof into which the shank of the tool extends, said bore being enlarged or counterbored as at 16 within the threaded end so that eccentricity of the external threads 9 with reference to the axis of the collet, or of the internal threads 7 with reference to the axis of the frusto-conical bore 6, will not throw the shank of the tool off-center, the gripping being within the mating frusto-conical surfaces 6 and 10 which tightly wedge together upon screwing in of the collet.

It is to be noted that the chuck as a whole is of very small diameter compared to the diameter of the shank of the tool gripped thereby, whereby the spinning weight is reduced to a minimum value, and thus said chuck has particular utility in high speed operations, for example from about 75,000 to 120,000 R. P. M., the shank of the tool in such cases usually being the spindle of a so-called "mounted point" tool wherein the grinding wheel may be ¼" diameter and the spindle or shank thereof may be ⅛" diameter.

It will be apparent that the overhanging portion 5 of the chuck as a whole, especially the portions thereof near the upper end in Fig. 1, should be of minimum diameter because even a slight unbalance will set up objectionable vibrations at such high speeds of rotation. By way of specific example, the bore 15 in the collet 8 is ground to a diameter of .125" for gripping a "mounted point" tool which has a spindle or shank of .125" diameter down to about .122" diameter, and the length of such bore will be about %6" or, in other words, about 4½ times the diameter thereof. The largest diameter of the collet is .305" or, in other words, .090" wall thickness. The wrench-engaging flats 11 are ¼" apart and serve to decrease the mass of this end of the collet. The tapered or frusto-conical portion 10 of the collet is about %6" long and the tubular portion 5 of the chuck body 1 at the large end of the frusto-conical bore is of approximately .050" wall thickness and the threads 7 and 9 in said body and on said collet are ¼-28 threads and the main reason for having the threads at the small ends of the collet 8 and of the frusto-conical bore 6 of the body 1 are to again keep the spinning weight to a minimum. Furthermore, the threads 7 and 9 arranged as shown are effectively sealed against chips, grit, or the like.

Other modes of applying the principle of the invention may be employed, change being made as regards the details described, provided the features stated in any of the following claims, or the equivalent of such, be employed.

We therefore particularly point out and distinctly claim as our invention:

1. A two-piece collet chuck comprising a body, and a collet therewithin, said body and collet being threaded together and formed with complementary wedge surfaces effective, upon screwing in of said collet, to radially contract the latter, said collet being formed with only one diametrical slot through each end terminating short of the opposite end to render the same readily contractible from end to end and being formed adjacent to one end with parallel wrench-engaging flats which are disposed in planes normal to the slot through such one end whereby contraction of said collet is ineffective to vary the distance between and parallelism of such flats.

2. The chuck of claim 1 wherein such wedge surfaces are frusto-conical, wherein said body and collet are respectively formed with internal and external threads adjacent to the small ends of such wedge surfaces, and wherein such wrench-engaging flats are adjacent to the large end of the wedge surface of said collet and axially beyond the end of said body.

3. The chuck of claim 2 wherein said collet has a tool shank receiving bore which is coaxial with said frusto-conical wedge surface thereof and which is counterbored within such externally threaded end portion so that a tool shank therein will not be thrown off-center by reason of eccentricity of such internal and external threads with respect to the axes of such frusto-conical wedge surfaces of said body and said collet.

4. A collet comprising a tubular member externally threaded at one end and formed with parallel wrench-engaging flats at the other end, and having an intermediate frusto-conical section of which the small end is adjacent to the threaded end, said member being formed with only one diametrical slot from the small end of said intermediate portion through its said other end in a plane normal to the wrench-engaging flats and with only one diametrical slot from the large end of said intermediate portion through its said one end.

5. The collet of claim 3 wherein said member has a bore therethrough which is enlarged in diameter within said one end.

References Cited in the file of this patent
UNITED STATES PATENTS

| | | |
|---|---|---|
| 337,244 | Chantrell | Mar. 2, 1886 |
| 836,613 | Spear | Nov. 20, 1906 |
| 1,383,146 | Perrin | June 28, 1921 |
| 1,869,322 | Bush | July 26, 1932 |
| 2,516,537 | Wetzel et al. | July 25, 1950 |